INVENTORS
ROBERT GORDON RUSSELL AND
HARRY LAURENCE FRED BOND
BY
*Bailey, Stephens & Huettig*
ATTORNEYS

INVENTORS
ROBERT GORDON RUSSELL AND
HARRY LAURENCE FRED BOND
BY
Bailey, Stephens & Huettig
ATTORNEYS

FIG. 10

June 27, 1961  R. G. RUSSELL ET AL  2,990,129
COILING STRIP MATERIAL

Filed Jan. 25, 1956  8 Sheets-Sheet 8

FIG. 11

ROBERT GORDON RUSSELL,
HARRY LAURENCE FRED BOND,
INVENTORS
BY Bailey, Stephens & Huettig
ATTORNEYS

United States Patent Office 2,990,129
Patented June 27, 1961

2,990,129
COILING STRIP MATERIAL
Robert Gordon Russell and Harry Laurence Fred Bond, Pilsley, near Bakewell, England, assignors, by mesne assignments, to Davy and United Engineering Company Limited
Filed Jan. 25, 1956, Ser. No. 561,242
Claims priority, application Great Britain Jan. 25, 1955
3 Claims. (Cl. 242—78.4)

This invention relates to the coiling of strip material and is concerned with mechanism for wrapping the first lap or laps of the material on a mandrel at the beginning of a coiling operation so as to enable the mandrel to exert the desired pull on the strip. The invention is particularly applicable to the coiling of strip delivered from rolling mills, specially hot rolling mills.

It is already known to arrange a series of wrapper rolls about a mandrel so as to guide the front of the strip about the periphery of a mandrel; and it is one object of the present invention to provide a series of such wrapper rolls in which the shocks due to inertia loads, as the tip of the strip passes between the mandrel and the succession of wrapper rolls, are materially less than has hitherto proved to be possible, thus reducing wear and vibration of the apparatus as well eliminating the shock waves that are liable to travel backwards along the strip approaching the mandrel. A further object of the invention is so to arrange the wrapper rolls and the parts immediately associated therewith that they can readily be removed for servicing.

According to the invention, apparatus for coiling strip material includes a mandrel on which the material is wound, a series of wrapper rolls distributed about the periphery of the mandrel so as to bear peripherally on the material being wound on the mandrel, a frame structure for supporting the wrapper rolls, and means interposed between the wrapper rolls and the frame structure enabling each wrapper roll to yield, independently of the other rolls, relatively to the frame, as the coil begins to build up on the mandrel. Advantageously the frame structure comprises two parts or frames arranged to be withdrawn from the mandrel on opposite sides thereof, when the strip has been lapped on the mandrel sufficiently for the latter to exert a firm pull on the strip without the assistance of the wrapper rolls. Thus the frames may be pivotally mounted to be swung towards and away from the mandrel, for example by hydraulic motors. Alternatively they may be arranged to be withdrawn horizontally from the mandrel on opposite sides thereof.

Preferably each wrapper roll is positively driven and the drive may be transmitted from stationary driving means by means of a flexible connection, such as a shaft with a universal joint at each end. Then the driving means may consist of as many electric motors as there are wrapper rolls, the motors being allocated respectively to the rolls. Alternatively wrapper rolls may be driven by motors mounted on the frames. For example, each motor may be arranged to drive a pair of wrapper rolls by an endless flexible band, such as a chain, a jockey pulley being arranged to take up the shock in the band when the wrapper rolls yield.

The yielding mounting for each wrapper roll may incorporate a spring, such as a torsion shaft or quill shaft. Thus each wrapper roll may be carried by arms on a tubular support journalled on the associated frame, a quill shaft passing through the support being anchored at one end to the support and at the other end to the frame. The quill shaft is pre-stressed and a stop limits the movement of the roll under the action of the quill shaft. Alternatively each wrapper roll may be mounted in bearing arranged to yield rectilinearly against compression springs.

In order that the invention may be clearly understood and readily carried into effect, constructions in accordance therewith will now be described, by way of example, with reference to the accompanying drawings, in which.

The hot strip is wound on a mandrel 1 which is described in the specifications of our co-pending Patent No. 2,941,744. This mandrel 1 is mounted horizontally in a bearing structure 2 at one end thereof and is driven by an electric motor 3 through gearing 4 and a shaft 5. The mandrel is arranged to contract so as to enable the coil of strip to be removed therefrom over the end of the mandrel remote from the bearing structure 2.

Figure 2:
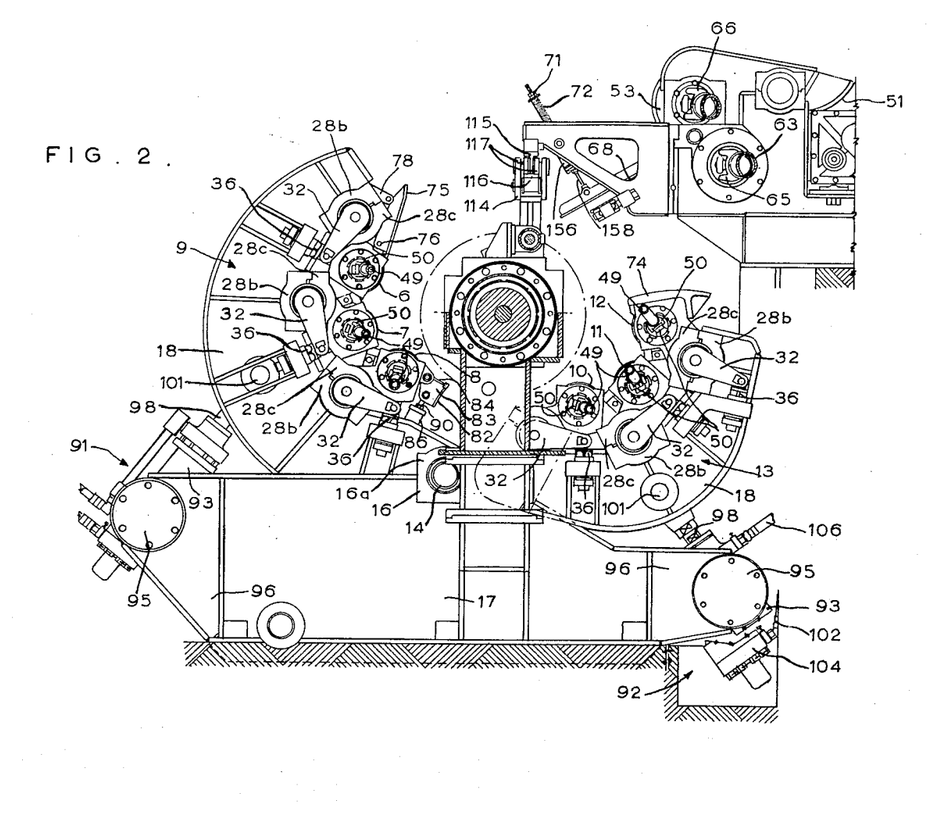
FIGURE 2 is a cross-section on the line II—II of FIGURE 1.
Figure 3:
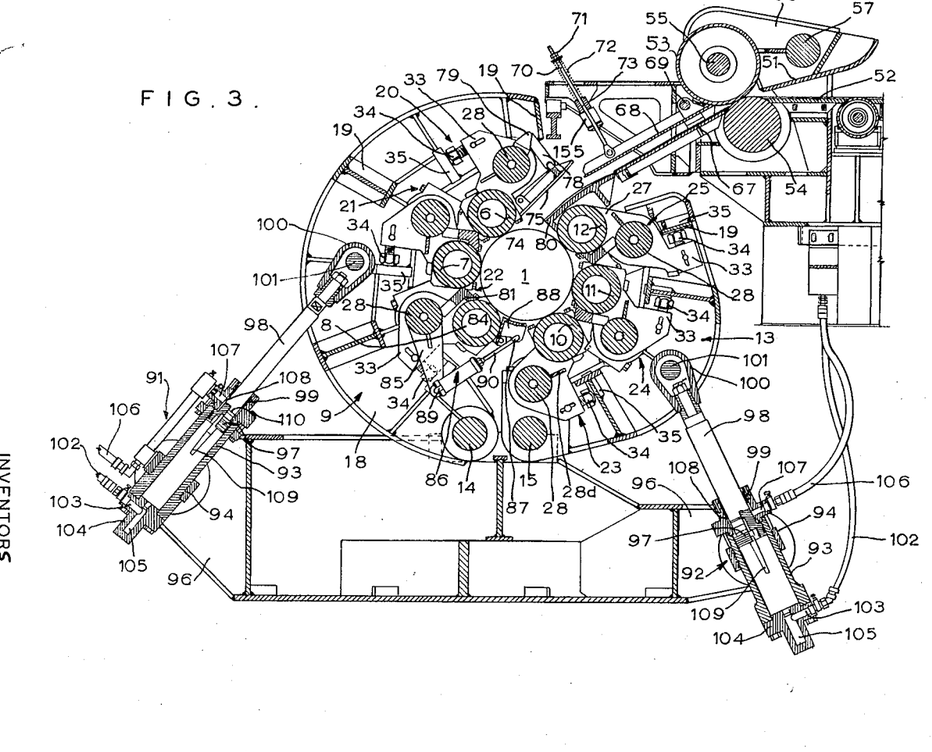
FIGURE 3 is a cross-section on the line III—III of FIGURE 1.

Distributed around the mandrel are six wrapper rolls 6, 7, 8 (carried by a frame 9) and 10, 11, 12 (carried by a frame 13). The frames 9, 13 are carried respectively by shafts 14, 15 arranged to be closed upon the mandrel as shown in FIGURE 3 and to be withdrawn therefrom as shown in FIGURE 2. It will be observed that the shafts 14, 15 are parallel to the mandrel, with their axes in a horizontal plane, the axis of the shaft 15 being substantially vertically beneath the mandrel axis and the axis of the shaft 14 to one side. The shafts 14, 15 are mounted to turn in bearings 16 in a rigid framework 17, the bearings comprising removable caps 16a.

The frames 9, 13 are stout arcuate cradles which are substantially similar to one another except that, as is clear from FIGURE 3, when the frames are closed on the mandrel the frame 9 extends round to a point vertically above the mandrel axis while the frame 13 does not extend far above the horizontal plane containing the mandrel axis, thereby providing a space through which the strip is fed to the mandrel. Each frame consists of two vertical flanged end plates 18 joined by transoms 19.

Figure 7:
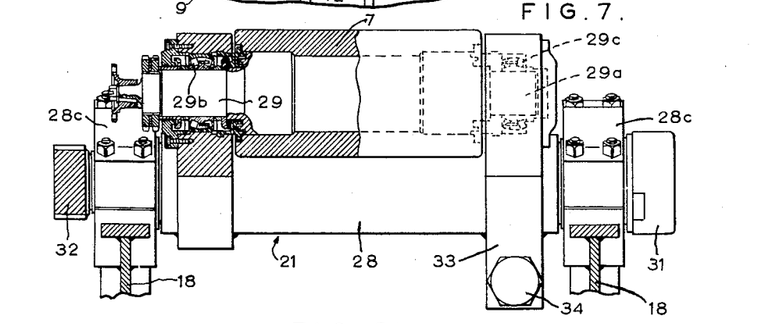
FIGURE 7 is a cross-section showing certain details.
Figure 8:
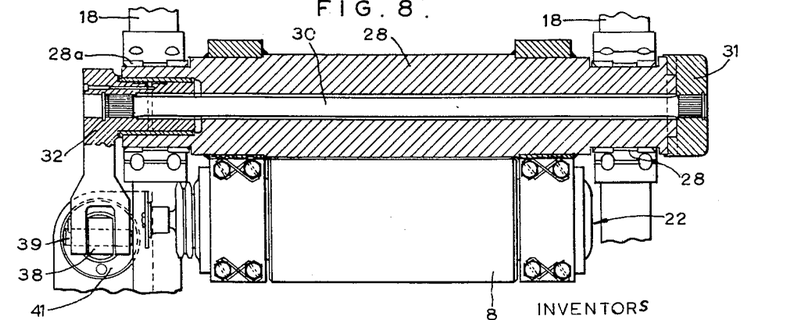
FIGURE 8 is a section on the line VIII—VIII in FIGURE 4.

The wrapper rolls 6, 7, 8, 10, 11, 12 are mounted, with their axis parallel to the mandrel, respectively in individual structures 20, 21, 22, 23, 24, 25. In each of these structures the wrapper roll is mounted between a pair of parallel levers 26, 27 fixed to a tubular support 28, the roll being formed with trunnions 29, 29a, carried by anti-friction bearings 29b, 30c (FIGURE 7) in the levers 26, 27. In each structure the tubular support 28 is journalled in anti-friction bearings 28a clamped in cradles 28b by bearing caps 28c, the cradles 28a being fixed to the end plates 18 of the associated one of the frames 9, 13. Each tubular support 28 and its levers 26, 27 are braced together by a web 28d. A quill shaft 30 extends through the support with some clearance. Each quill shaft 30 is splined to a member 31 fixed to the end of the associated tubular support 28 and at the other end is splined to a lever 32 formed with a journal pivoted co-axially in the adjacent end of the tubular support 28.

Figure 6:
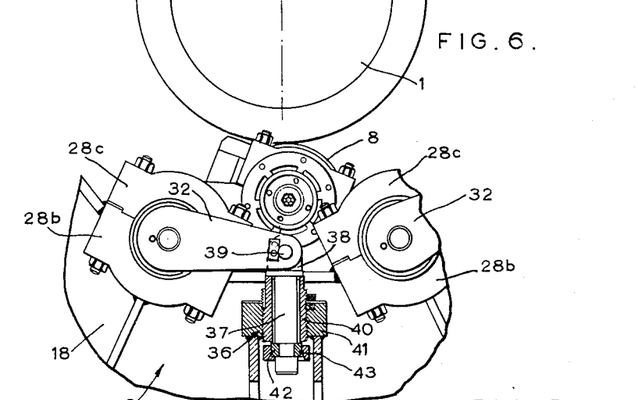
FIGURE 6 is an end view, partly in section, on an enlarged scale of certain mechanism appearing in FIGURE 2.

So as to limit the movement of each tubular support 28 about its axis, each of the levers 27 is formed with an extension 33 which carries an adjustable head 34 that engages a stop 35 on the associated one of the frames 9, 13. Each quill shaft 30 is torsionally strained so as to load the associated structure 20—25 in such a direction as to maintain the head 34 in engagement with its stop 35, except when the structure is turned about the axis of the quill shaft, so as to strain the latter further, as described below. For this purpose, each quill shaft lever 32 is joined to the associated one of the frames 9, 13 by an adjustable anchorage 36. Referring to FIGURE 6 it will be seen that each such anchorage comprises a flanged rod 37 formed with a lug 38 pivotally attached between a forked end of the associated lever 32 by a pin 39. Each rod 37 passes with some clearance through a sleeve 40 screwed into a member 41 rigidly fixed to the associated one of the frames 9, 13. The rod 37 exerts an axial thrust on the sleeve 40, under the action of the strain in the associated one of the quill shafts 31 through the medium of a split collar 42 maintained in a peripheral recess in the rod 37 by a nut 43.

It will be observed from FIGURE 2 that while the anchorages 36 associated respectively with the wrapper rolls 6, 7, 8, 10, 11 are radially disposed with respect to the frames 9, 13, that associated with the wrapper roll 12 is tangentially arranged so that this anchorage 36 and its lever 32 are kept clear of the means, to be described below, for guiding the strip between the upper ends of the frames 9, 13. For the same purpose the extension 33 of the lever 27 for the wrapper roll 12 is, as shown in FIGURE 3, substantially in alignment with the lever 27 instead of being set at an angle thereto as in the structures 20—24.

It will also be observed from FIGURE 3 that on each frame 9, 13 the three wrapper rolls 6, 7, 8 or 10, 11, 12 are equidistantly spaced from one another and each is arranged to be forced clockwise about the axis of its tubular support away from the mandrel 1. However, the space between the two uppermost rolls 6, 12 is somewhat greater than the space between any two adjacent rolls on an individual frame 9, 13, so as to provide space for the guiding of the strip into the cluster of rolls. The space between the two lower-most rolls 8, 10 is also somewhat greater than the space between any two rolls on an individual frame but less than that between the rolls 6, 12.

The six wrapper rolls 6, 7, 8, 10, 11, 12 are driven respectively by six electric motors 44. These motors are mounted in two groups of three on opposite sides of the mandrel shaft 5. The motors 44 in each group are mounted one above the other respectively on platforms 45 on a pedestal 46. Each motor has a co-axial shaft 47 connected by a universal joint 48 to a shaft 49 connected at its opposite end by a universal joint 50 to one of the trunnions 29a, 29b on the associated wrapper roll. To allow for the movement of the frames 9, 13 about the axes of the shafts 14, 15 the shafts 49 are made telescopic, but the two parts of each shaft are splined to one another so as to transmit rotation.

The strip to be coiled is led from the rolls of a hot mill between guide plates 51, 52 to positively driven pinch rolls 53, 54 from which it travels in a downwardly inclined direction to the right between the wrapper roll 6 and the mandrel 1. The uppermost pinch roll 53 is fixed to a shaft 55 carried by a frame 56 fixed to a shaft 57 which is adjustable about its axis by means that form no part of the present invention and so will not be described. The upper guide plate 51 is also fixed to the shaft 55. The pinch rolls 53, 54 are both driven by an electric motor 58 through a shaft 59 connected by gearing to a shaft 60, the shaft 59, 60 being connected by universal joints 61, 62 to shafts 63, 64 which, in turn are connected by universal joints 65, 66 respectively to the pinch rolls 53, 54.

Figure 1:
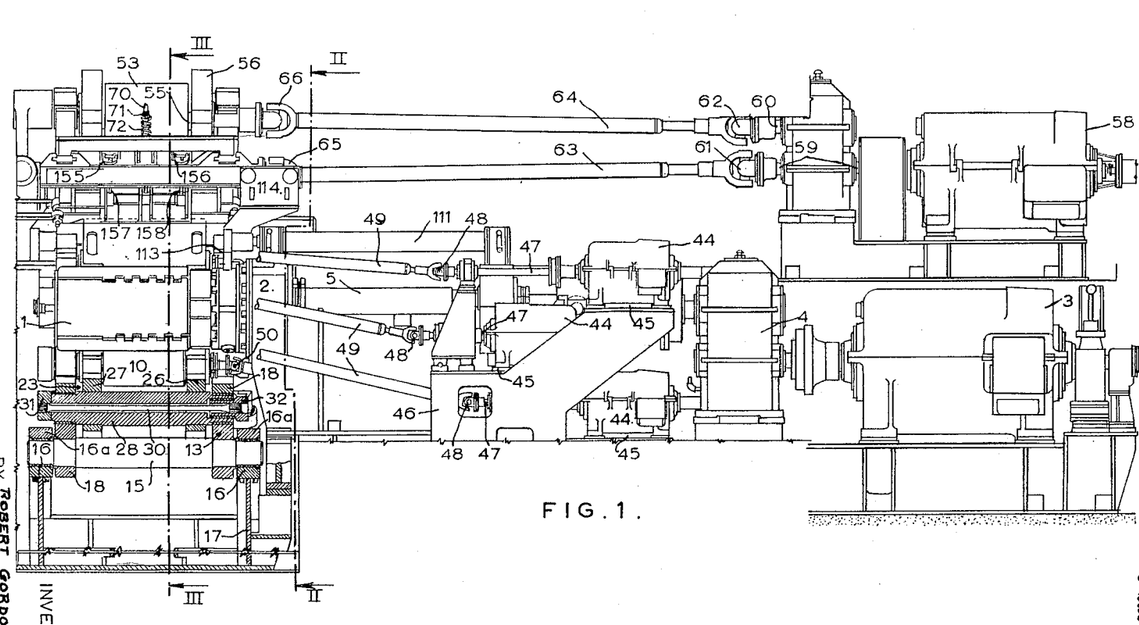
FIGURE 1 is a side elevation of hot strip coiling machinery.

On emerging from the pinch rolls 53, 54 the strip travels between a fixed lower plate 67 and an upper plate 68 pivoted about the axis of a shaft 69 close to the pinch rolls and supported close to the mandrel 1 by a rod 70 having an abutment 71 at its upper end bearing against a compression spring 72. The rod 70 is pivoted to the plate 68 and guided by a pivoted bearing 73, against which the lower end of the spring 72 bears. The spring 72 is kept compressed by hydraulic pressure above pistons in two oscillating cylinders 155, 156, the piston rods 157, 158 (FIGURE 1) being pivoted to the plate 68.

After travelling between the plates 67, 68 the strip reaches the space between a lower guide plate 74 fixed to the uppermost wrapper roll structure 25 on the frame 13 and an upper guide plate 75 pivoted to the frame 9 about an axis 76. Above its outer end this plate 75 is connected by a pivoted link 78 to an arm 79 fixed to the tubular support 28 for the wrapper roll 6. Thus, as the wrapper roll 6 is swung outwards on the frame 9 due to the building up of strip on the mandrel 1, the upper plate 75 is turned about its axis 76 to conform to the changed path of the strip passing tangentially to the roll. The lower guide plate 74 is formed with a lip 80 that overlies and nearly touches the wrapper roll 12 so as to guide the front edge of the strip, rising between the mandrel 1 and wrapper roll 12, round to the bight between the mandrel 1 and the tangentially approaching strip. Fixed also to this guide roll structure 25 is a second member 81 formed with a flange that nearly touches the wrapper roll 12 below its line of contact with the mandrel 1 and serves to ensure that the leading end the strip passes to such line of contact. Similar flanged members 81 are mounted also on the wrapper roll structures 21, 22 and 24.

A guide flap 82 (FIGURE 3) is journaled about an axis to the levers 26, 27 carrying the wrapper roll 8. This flap 82 bridges the space between the wrapper rolls 8, 10. The flap 82 has depending flanges 83 at its ends which carry journals for its bearings. An arcuate plate 84 extends downwards from one edge of the flap 82 along the edges of the flanges 83 close to the roll 8 to a point close to the journal bearings. In order to control the position of the flap 82 about its axis 77, the tubular support 28 in the structure 22 carrying the wrapper roll 8 is furnished with a radial arm 85 (appearing only in FIGURE 3) connected by a pivotal link, incorporating a pneumatic piston and cylinder assembly 86, to a journal 87 carried by two further flanges 88 close to the centre of the flap 82 (in the direction of the mandrel axis). The link is, of course, in two parts 89, 90, one carrying the cylinder and the other the piston. Compressed air is supplied when it is required to urge the piston in one direction with respect to the cylinder and exhausted to enable a spring to urge the piston in the opposite direction with respect to the cylinder.

In order to rock the frames 9, 13 respectively about the axes of the shafts 14, 15, two double acting hydraulic piston and cylinder assemblies 91, 92 are provided. Each of these comprises a cylinder 93 embraced by a strap 94, fixed thereto, carrying trunnions mounted in bearings 95 carried by very rigid fixed arms 96. A piston 97 is mounted to slide in each cylinder 93 and a piston rod 98 is fixed to each piston and extends through a stuffing box 99 at the top end of each cylinder. Each piston rod 98 has fixed to its upper end a long transverse sleeve 100 having internal webs carrying a shaft 101 journalled in the end plates 18 of the associated frame 9 or 13.

When the wrapper rolls are closed on the mandrel 1 as shown in FIGURE 3, hydraulic pressure is maintained beneath the pistons 97 through flexible pipes 102, and ports 103 in cylinder heads 104. Each port 103 leads into an axial passage 105 opening into the associated cylinder. In order to lower the frames 9, 13 from the positions of FIGURE 3 to those of FIGURE 2 the flexible pipes 102 are connected to exhaust to a reservoir so that gravity, aided by liquid under pressure passing through flexible pipes 106 and ports 107 leading to spaces 108 surrounding the piston rods 98, forces the piston 97 to travel down the cylinders 93 while the assemblies 91, 92 swing respectively counterclockwise and clockwise (FIGURE 3). In order to bring this movement to rest without shock the pistons 97 are provided with tapered pins 109 that progressively cut off the exhaust through the ports 103 as the pins enter the axial passages 105. Similarly when the pistons are raised shock is prevented at the ends of the piston strokes by tapered portions 110 of the piston rods 98 entering the spaces 108 surrounding the piston rods.

Figure 4:
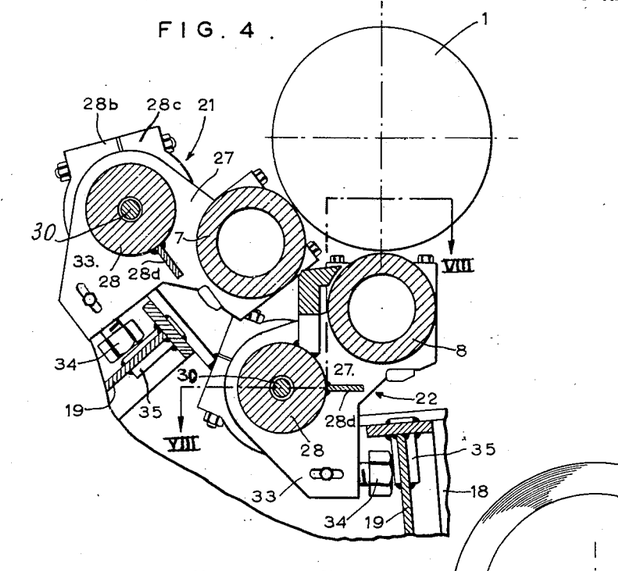
FIGURE 4 shows on an enlarged scale certain mechanism appearing in FIGURE 3.
Figure 5:
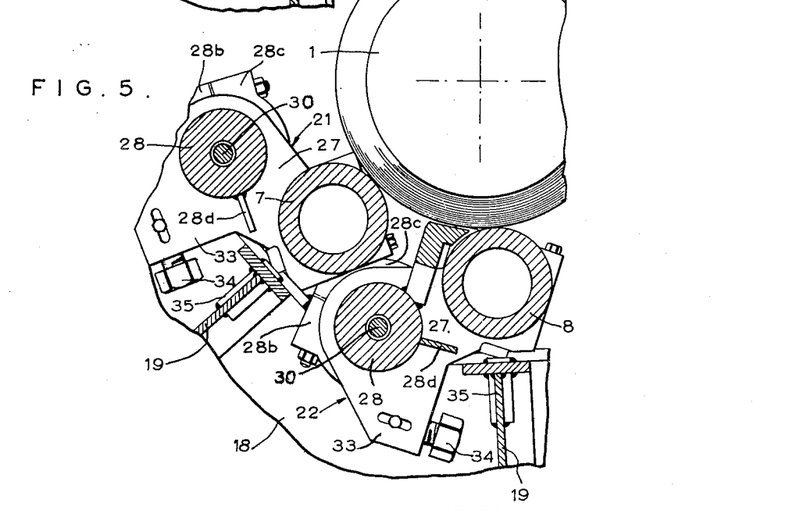
FIGURE 5 is similar to FIGURE 4 but shows certain parts in different positions.

In operation, the strip is delivered over the mill table rolls to the pinch rolls 63, 54 then to the mandrel 1, the latter being rotated at a speed, relative to the pinch rolls, sufficient to keep the strip under tension. Initially the heads 34 are set so that the wrapper rolls 6, 7, 8, 10, 11, 12 are just clear of the mandrel 1 but, as the front edge of the strip reaches each wrapper roll in succession, it urges it radially outwards slightly swinging it about the axis of its tubular support 28 against the action of the associated quill shaft 30. The flap 82 between the wrapper rolls 8, 10 also swings outwards with its associated wrapper roll 8. The wrapper rolls continue to be urged outwards (from positions as shown in FIGURE 4 to positions as shown in FIGURE 5), while the frames 9, 13 remain stationary, i.e. until after about six turns, when the strip is securely under way. As soon as the mandrel motor 3 is fully loaded a first solenoid operated valve causes hydraulic pressure to be reduced beneath the pistons 97, so that pressure above pistons 97 and the pressure above the piston rods 98 urges the latter downwards to swing the frames 9, 13 away from the mandrel. Simultaneously a second solenoid operated valve causes pressure to be released from the cylinders 155, 156 so that the plate 68 is raised under the influence of the spring 72 in order to avoid frictional contact between the plate 68 and the strip being coiled. To provide for possible failure of the said first solenoid operated valve, a switch actuated by one of the wrapper roll structures 20—25, is operated to produce the same result when the wrapper roll structure has been urged to the position corresponding to the coil being securely under way. To provide for possible failure of both these devices a manually operated safety hydraulic switch may be provided.

The outward movement of the wrapper rolls relatively to the frames 9, 13 may be limited by stops that prevent any excessive strain on the quill shafts 30 in the event of the aforesaid switches failing or in the event of serious shocks being experienced by the wrapper rolls due to particularly thick gauge strip. When these safety stops engage due to the failure of the switches, and the diameter of the coil continues to increase, the frames 9, 13 themselves yield against the hydraulic pressure in the assemblies 91, 92.

When the frames have been withdrawn as a result of the switch actuation aforesaid the coiling continues out of contact with the wrapper rolls. However, as the coiling approaches its end, the frames 9, 13 are swung inwards towards the mandrel 1 once more so that the wrapper rolls keep the tail end of the strip under control. This is effected by the manual control of the supply of liquid under pressure through the flexible pipes 102 to the cylinders 93.

Prior to the aforesaid outward movement of the frames 9, 13 away from the mandrel 1, pneumatic control of the piston and cylinder assembly 86 in the flap link 89, 90 is effected automatically to shorten the link and prevent the flap 82 from fouling the coil. The flap 82 is retained in this withdrawn position in the aforesaid inward movement of the frames.

When the winding is complete the frames are once more withdrawn and the mandrel 1 is caused to contact so that the coil only makes firm contact with the mandrel 1 along the top of the latter. The coil can then be stripped from the mandrel by the operation of stripper mechanism comprising a hydraulic cylinder 111 (FIGURES 1 and 2) containing a double acting piston connected by a piston rod 112 to a stripper member 113 carried by a carriage 114, that runs on a rail 115, the rail being formed with a bottom flange 116 above which run rollers 117 and beneath which run rollers 118 carried by the carriage 114.

It will be appreciated that the apparatus can be very readily serviced in that each wrapper roll assembly can be removed as a unit after removing the bearing caps 28c for the tubular support 28 and disconnecting the quill shaft lever 32.

It will be appreciated that the assembly enables large bearings 29a, 30a to be used for each wrapper roll, thus providing a very robust construction. Moreover, the arrangement of each frame 9, 13 is such that thet entire frame, with its shaft and the assemblies carried thereby, can be lifted away from the shaft bearings 16 to enable repairs to be effected. The withdrawal is preferably effected laterally parallel to the mandrel axis away from the driven end of the mandrel 1 by means of weight balanced porter bars carried by a conveyor and arranged to engage points on the adjacent frame plate vertically above and below the axis on which the centre of gravity of the frame and the parts carried thereby lies. The joint between each porter bar and the end plate is effected by a peel and retractable bolt entering appropriate slots and an aperture in the end plate.

Figure 9:
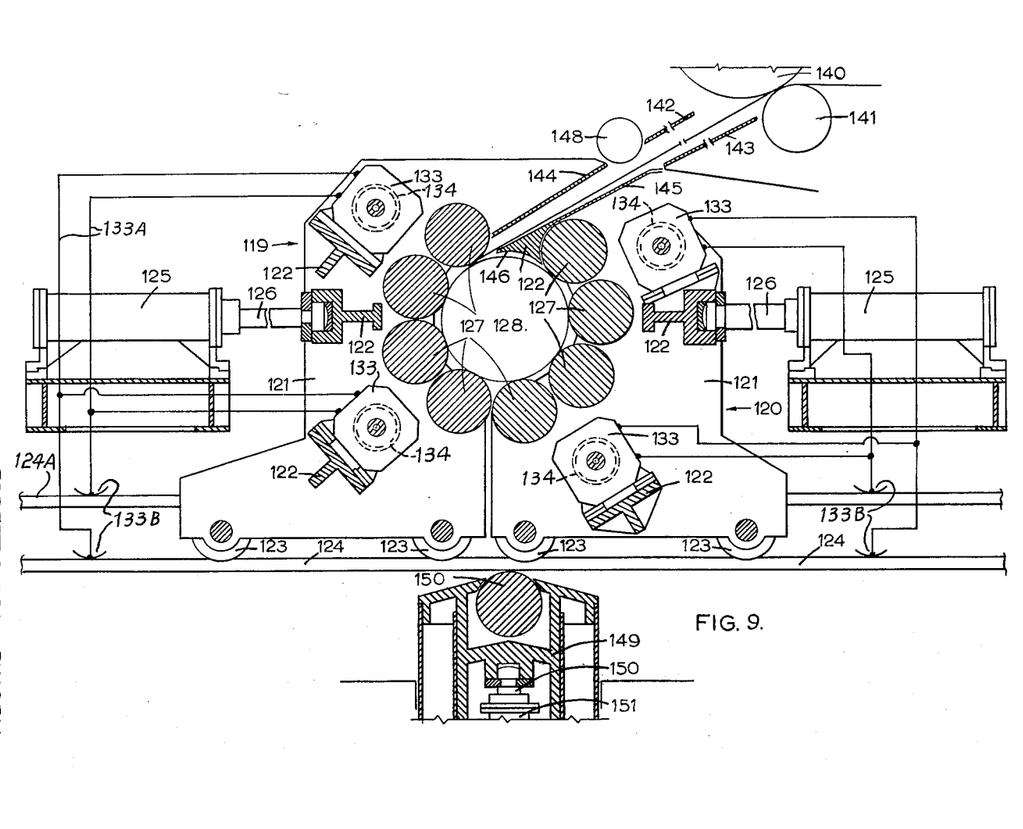
FIGURES 9 and 10 are similar sectional side elevations of a modified form of hot strip coiling machinery, respectively showing the machinery in two different phases of its cycle of operations.
Figure 10:
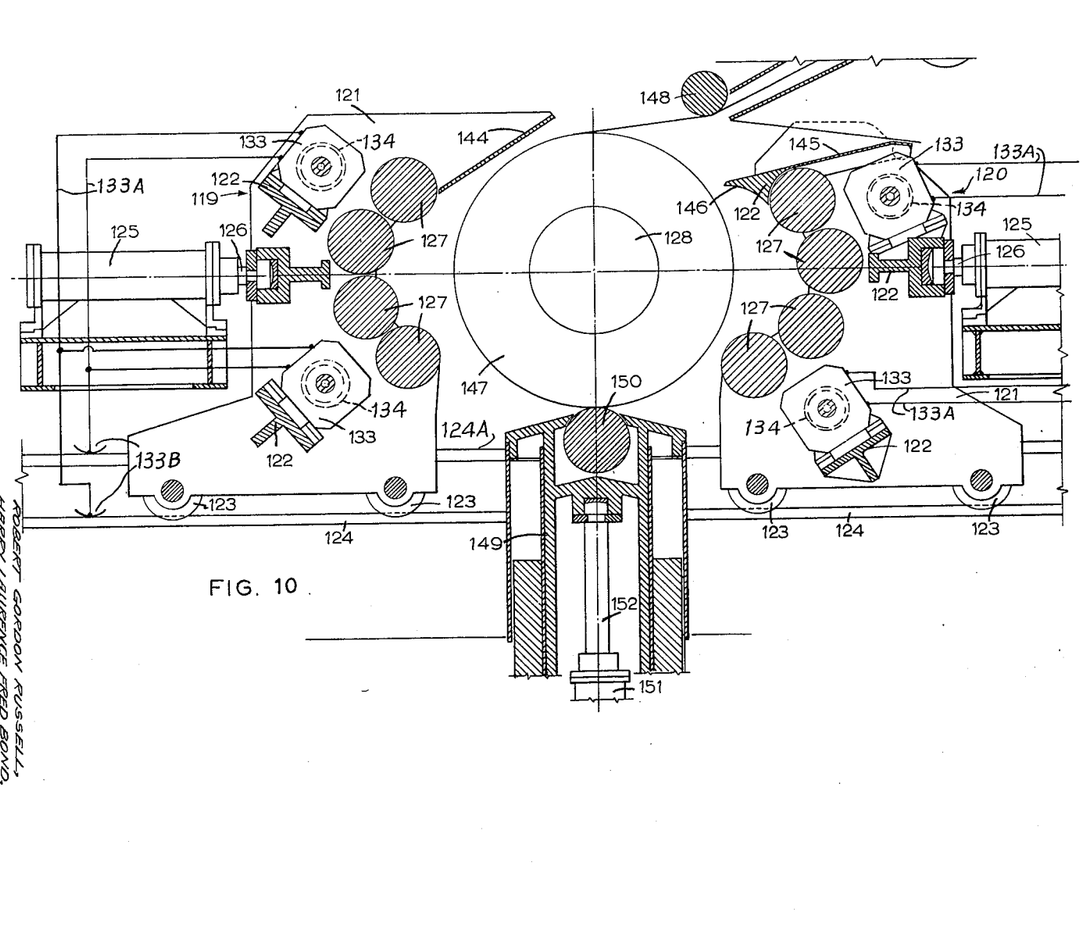
Figure 11:
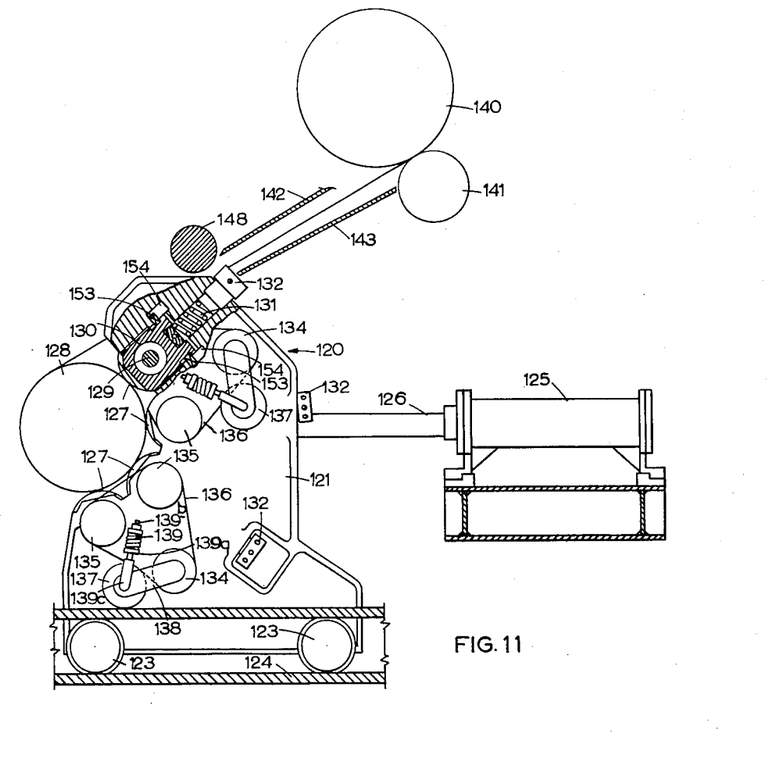
FIGURE 11 is a side elevation, partly in section, of a portion of the machinery appearing in FIGURES 9 and 10.

Referring now to the construction of FIGURES 9 to 11, it will be observed that there are again two frames 119, 120, each consisting of end plates 121 joined by transoms 122, but these are not mounted for pivotal movement but for rectilinear movement. Thus, each frame 119, 120 is mounted on four wheels 123 arranged to run on rails 124. The movement is imparted by fixed piston and cylinder assemblies 125 having piston rods 126 fixed respectively to the centres of two of the transoms 122, one in each frame. In the initial winding phase the frames are in the positions of FIGURE 9 with the wrapper rolls 127 in a cluster round the mandrel 128. After winding has continued sufficiently for the coil to grip the mandrel 128 unaided, the frames 119, 120 are withdrawn to the positions of FIGURE 10.

In this case there are four wrapper rolls 127 on each frame and each roll is formed at its ends with trunnions 129 rotatable in bearing blocks 130 slidably mounted in the end plates 121. The sliding movement of the bearing blocks 130 is in such a direction that they can yield radially with respect to the axis of the mandrel, when the wrapper rolls 127 are in the positions of FIGURE 9. Such yielding movement of each bearing block 130 takes place against a helical compression spring 131 interposed between the block and adjustable abutment 132.

In this example, the wrapper rolls are driven by electric motors 133 mounted inside the frames 119, 120. The motors 133 may be supplied with electric current through conductors 133A and shoes 133B (shown diagrammatically) that run on one of the rails 124 and a further rail 124A. There are two motors 133 on each frame, respectively connected to drive the two pairs of wrapper rolls 127. Thus each motor 133 drives a sprocket 134 on one of the outer faces of its frame 119 or 120 and this sprocket 134 drives two sprockets 135 respectively on the adjacent trunnions of its associated rollers, through the medium of a chain 136. Each chain is kept taut by a jockey wheel 137 carried by a pivoted lever 138 and loaded by a helical compression spring 139 interposed between a fixed abutment 139a and a collar 139b fixed to a rod 139c pivoted to the lever 138. This spring takes up the slack when the associated rolls 127 yield against their springs 131.

When the parts are in the positions of FIGURE 9 and winding begins, the strip passes from the pinch rolls 140, 141 between fixed guide plates 142, 143 to guide plates 144, 145 mounted respectively on the two frames 119, 120, the plate 145 forming part of the transoms 122. As the strip completes one lap of the mandrel 128 it is guided beneath the tangentially incoming length of strip by an arcuate guide surface 146 formed beneath the aforesaid one of the transoms 122.

When the frames with the guide plates 142, 143 have been withdrawn as shown in FIGURE 10, and the coil 147 has built up to a subtsantial size, the strip is guided to the coil by a freely pivoted roller 148 beyond the fixed guide plate 142.

As the terminal end of the strip reaches the coil, a frame structure 149 carrying a freely pivoted roller 150 is lifted from the position of FIGURE 9 to that of FIGURE 10, in which the roller 150 rolls on the periphery of the coil, preventing it from unravelling. The up and down movement of the frame structure 150 is effected by a hydraulic piston and cylinder assembly 151 comprising a piston rod 152 fixed to the structure.

Forward movement of each bearing block 130 under the action of its spring 131, is limited by pins 153 on the block 130 that slide in slots 154 in the end plates 121 and engage the ends of the slots 154 when the block is in its forwardmost position.

We claim:

1. Apparatus for coiling strip material comprising in combination, a mandrel on which the material is wound, the mandrel being mounted for rotation about a horizontal axis, means for rotating the mandrel, a sectional frame structure having two, and only two, opposed rigid sections, means for supporting said sections at a level below said mandrel, said sections mounted to move on said supporting means between positions in which said frame structure is closely disposed about substantially the whole of the periphery of said mandrel and in which said sections are substantially removed from said mandrel on opposite sides thereof, hydraulic piston and cylinder motor means for rapidly moving said frame structure from said first-mentioned position to said second-mentioned position, a plurality of supporting structures for wrapper rolls mounted independently of one another on each said section, and each said supporting structure including bearing means for a wrapper roll parallel to said mandrel and resilient means for resiliently urging said bearing means towards the periphery of said mandrel, wrapper rolls allocated respectively to said supporting structures and carried by the bearing means therein, and motor means for driving each of said wrapper rolls about its individual axis.

2. Apparatus for coiling strip material comprising in combination, a mandrel on which the material is wound, the mandrel being mounted for rotation about a horizontal axis, means for rotating the mandrel, a sectional frame structure having two, and only two, opposed rigid sections, means for supporting said sections at a level below said mandrel, said sections being mounted to move on said supporting means between positions in which said frame structure is closely disposed about substantially the whole of the periphery of said mandrel and in which said sections are substantially removed from said mandrel on opposite sides thereof, hydraulic piston and cylinder motor means for rapidly moving said frame structure from said first-mentioned position to said second-mentioned position, a plurality of supporting structures for wrapper rolls mounted independently of one another on each said section, and each said supporting structure including a tubular support pivotally mounted on said frame structure about an axis parallel to said mandrel axis, bearing means fixed to said tubular support for a wrapper roll parallel to said mandrel axis, wrapper rolls allocated respectively to said supporting structures and carried by the bearing means therein, and a stressed torsion rod mounted concentrically within said tubular support and anchored at one end to said frame structure and at the other end to said tubular support so as to urge said bearing means towards the periphery of said mandrel, and motor means for driving each of said wrapper rolls about its individual axis.

3. Apparatus according to claim 2, in which said supporting means provide closely juxtaposed pivotal axes for said sections, located substantially below said mandrel, and in which said hydraulic motor means are adapted to swing said sections to-and-fro about said axes in opposite directions.

References Cited in the file of this patent
UNITED STATES PATENTS

| | | |
|---|---|---|
| 383,686 | Bansen | May 29, 1888 |
| 1,141,771 | Carpenter | June 1, 1915 |
| 1,462,411 | Johnson | July 17, 1923 |
| 1,985,501 | Hudson | Dec. 25, 1934 |
| 2,161,076 | Morgan | June 6, 1939 |
| 2,526,010 | Edstrom | Oct. 7, 1950 |
| 2,628,790 | Schmidt et al. | Feb. 17, 1953 |
| 2,693,919 | Wutscher | Nov. 9, 1954 |
| 2,756,942 | Sieger | July 31, 1956 |

FOREIGN PATENTS

| | | |
|---|---|---|
| 706,282 | Great Britain | Mar. 24, 1954 |